United States Patent [19]

Matty

[11] 4,284,930

[45] Aug. 18, 1981

[54] MOTOR CONTROL APPARATUS AND METHOD

[75] Inventor: Thomas C. Matty, North Huntingdon, Pa.

[73] Assignee: Westinghouse Electric Corp., Pittsburgh, Pa.

[21] Appl. No.: 86,380

[22] Filed: Oct. 19, 1979

[51] Int. Cl.³ .............................................. H02P 3/08
[52] U.S. Cl. .................................. 318/269; 318/302; 318/363
[58] Field of Search ................. 318/269, 341, 302, 363

[56] References Cited

U.S. PATENT DOCUMENTS

| | | | |
|---|---|---|---|
| 3,295,037 | 12/1966 | Bullene | 318/269 |
| 3,325,714 | 6/1967 | Torii | 318/269 |
| 3,808,481 | 4/1974 | Rippel | 318/341 |
| 3,924,168 | 12/1976 | Woodward | 318/294 |

Primary Examiner—David Smith, Jr.
Attorney, Agent, or Firm—R. G. Brodahl

[57] ABSTRACT

A direct current motor controlling apparatus determines the operational speed of one or more direct current motors such as traction motors propelling a passenger vehicle along a track. The speed of the motor is established by changing the on and off conduction ratio or duty-cycle relationship of a switch device to determine the field current and the armature voltage of that motor. The present apparatus utilizes solid-state switch devices to determine the mode of operation of the motor control apparatus which solid-state switch devices are more reliable and more simple in operation and less expensive to maintain.

10 Claims, 8 Drawing Figures

MOTOR CONTROL APPARATUS AND METHOD

CROSS REFERENCE TO RELATED APPLICATION

The present application is related to a patent application Ser. No. 968,950 filed Dec. 13, 1978 by F. J. Prines et al. and entitled "Traction Motor Current Control Apparatus", which is assigned to the same assignee as the present application and the disclosure of which is incorporated herein by reference.

BACKGROUND OF THE INVENTION

It is known in the prior art to control the speed of a direct current series motor by a chopper apparatus including a thyristor switch device in series with the motor. Speed control of the motor is provided by varying the width of voltage pulses supplied to the motor such that the resulting average power supplied to the motor establishes the operational speed thereof. A commutation circuit including a charge capacitor has been used to provide a biased voltage across a conducting thyristor device for commutating the conduction of that thyristor device. A traction motor is operative in a motoring mode when the passenger vehicle is being propelled or accelerated along a track and in a brake mode when the vehicle is being stopped or decelerated.

As described in a published article in the *Westinghouse Engineer* for March 1973 at pp. 34–41 the average voltage applied to the motor armature is controlled by adjusting the ratio of chopper off-time to the chopper on-time with the resulting average motor armature current determining the motor torque for moving the vehicle along the track.

In the motoring or power mode of operation the motors of a vehicle are connected in relation to a direct current voltage source such that current is supplied through a chopper when the chopper is on and through the motors to ground. When the chopper is turned off the energy stored in the motor reactor and the inductance of the motor field maintains current flow in the motor circuit through a freewheeling diode. In the brake or deceleration mode of operation the motors in the prior art were reconnected by mechanical changeover switches with the motors operative as self-excited generators to provide dynamic or regenerative braking of the vehicle. With the chopper on the motor current increases and with the chopper off the current is forced into the power supply through the freewheeling diode by the motor reactor.

SUMMARY OF THE INVENTION

The present invention provides an improved direct current motor controlling apparatus which utilizes solid-state switching devices to determine a desired one of a power or acceleration mode of operation and a brake or deceleration mode of operation for the motor control apparatus.

DESCRIPTION OF THE PREFERRED EMBODIMENT

Figure 1:
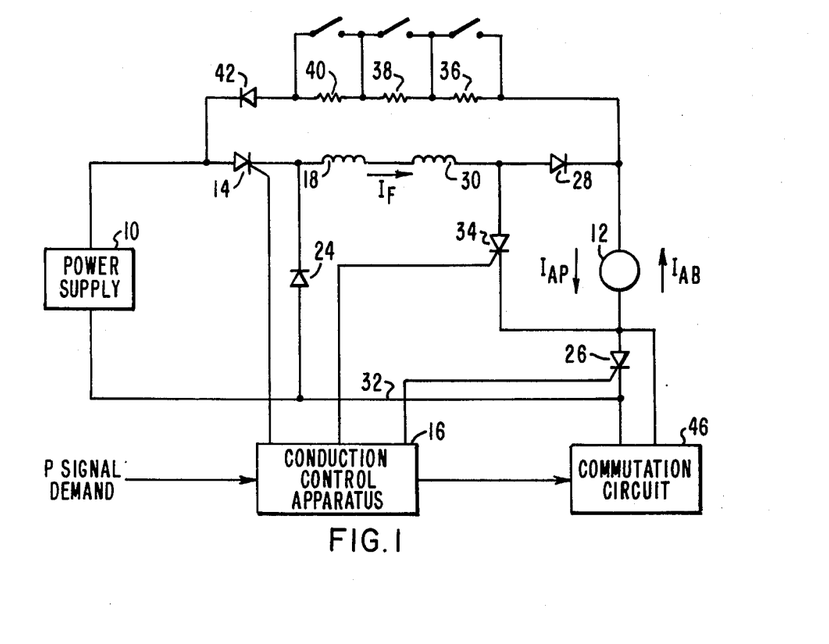
FIG. 1 shows the direct current motor control apparatus of the present invention.
Figure 2:
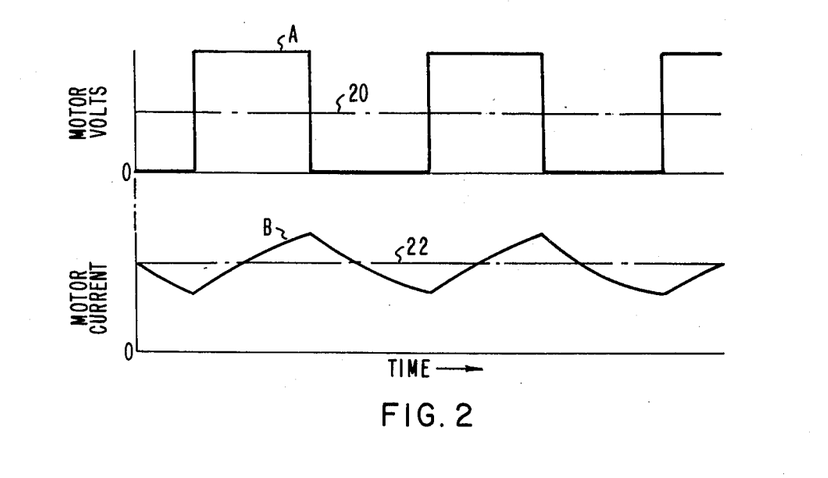
FIG. 2 shows the provided voltage in current relationships to determine the operation of the direct current motor in accordance with the present invention.

In FIG. 1 there is shown a direct current motor control apparatus for determining the average current supplied from a direct current source 10 to a direct current motor load 12 and including a series main thyristor device 14 that repetitively operates in an ON condition and an OFF condition to chop and regulate the voltage applied to the motor load 12. The control of this voltage is determined by changing the ON operation time in relation to the OFF operation time of the conduction by the main thyristor 14 for controlling the speed of the motor 12. The speed of a DC series-field traction motor is proportional to the armature voltage and inversely proportional to the field current or field flux in accordance with the relationship that the speed S is proportional to the armature voltage E divided by the field flux $\phi$. To reduce the speed of the motor 12 the armature voltage is decreased and to increase the motor speed the armature voltage is increased. The power supply for a typical traction motor application can be a relatively constant direct current voltage source such as 900 volts from a central power station. As is well known to persons skilled in this art, the main thyristor switch 14 is gated by a conventional conduction control apparatus 16, in response to the P signal effort request on input 17, to close and become conductive and is subsequently commutated to open and become not conductive as required to provide a desired average voltage across the motor armature 12 which determines the motor speed. Each time the main thyristor switch 14 conducts, the voltage across the motor armature 12 and the motor reactor 18 rises to the voltage $E_B$ of the power supply 10 as shown in the motor voltage curve A of FIG. 2. Each time the main thyristor 14 blocks, the voltage across the motor armature 12 and the motor reactor 18 falls to zero as shown by the curve A. The motor 12 responds to the average motor voltage 20. If the main thyristor switch 14 remains conductive for a longer time period, this raises the average motor voltage and if the main thyristor switch 14 remains blocked for a longer time period, this lowers the average motor voltage. The motor current increases as shown by curve B of FIG. 2 each time the thyristor switch 14 becomes conductive and then decreases each time the main thyristor switch 14 blocks with the inductive effect of the motor armature 12 and the motor reactor choke 18 causing the current wave shape shown in curve B. The average motor current 22 is proportional to the torque of the motor 12. The freewheeling diode 24 allows the motor current to continue due to the inductance of the circuit after the main thyristor switch 14 blocks and becomes non-conductive to result in the motor current having the wave shape of curve B.

A power thyristor switch 26 is made conductive when it is desired for the motor circuit to operate in the power or acceleration mode for the propulsion of the vehicle coupled with the motor armature 12. A power diode 28 and a motor field winding 30 are connected in the power mode circuit including the power thyristor switch 26, the return conductor 32, the voltage source 10 and the main thyristor switch 14. A brake thyristor switch 34 is made conductive when it is desired for the motor circuit to become operative in the brake or deceleration mode. When dynamic braking operation is desired one or more of the braking resistors 36, 38 and 40 are included in the brake circuit including the brake diode 42. A well-known commutation circuit 46 is operative to terminate the conduction of the power thyristor switch 26 when it is desired for the motor circuit to operate in the brake mode with the brake current flowing through the motor armature 12.

Figure 3:
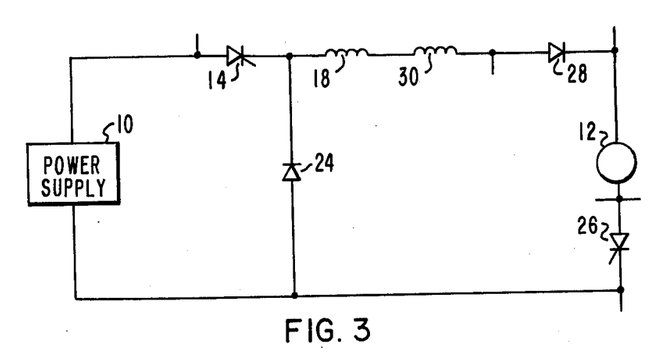
FIG. 3 shows the direct current motor control apparatus of the present invention in the power or acceleration mode of operation.

As shown in FIG. 3 the power thyristor switch 26 is made conductive when the motor circuit is desired to operate in the power mode for the propulsion of the vehicle coupled with the motor armature 12. This causes current to flow through the power diode 28, the motor field 30 and the motor reactor 18 from the main thyristor 14 to the ground return conductor 32 connected with the voltage source 10. The conduction control of the main thyristor 14 can now modulate and determine the average current flow in the circuit including motor armature 12. When the main thyristor switch 14 is not conducting the energy stored in the motor reactor and the field winding 30 maintains the current flow in the motor armature 12 through the freewheeling diode 24.

Figure 4:
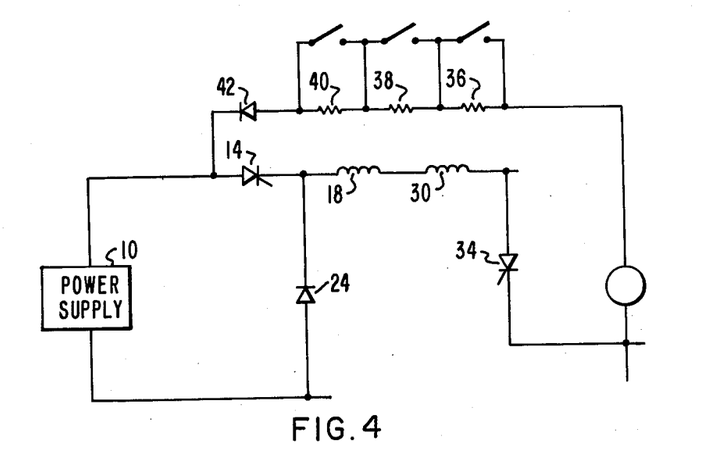
FIG. 4 shows the direct current motor control apparatus of the present invention of the present invention operative in the brake or deceleration mode of operation.

As shown in FIG. 4 the brake thyristor switch 34 is made conductive when the motor circuit is desired to operate in the brake mode for dynamic or regenerative braking of the vehicle coupled with the motor armature 12, with the main thyristor 14 conducting the brake mode current flows from the generating motor armature 12 through any of the brake resistors 36, 38 and 40 that are not short circuited to determine the desired level of dynamic braking effort as well known to persons skilled in this art, and through the brake diode 42, the main thyristor 14, the motor reactor 18 and the motor field 30 through the brake thyristor 34 and up through the motor armature 12. This provides current through the motor field 30 in the brake mode which remains substantially the same as determined by the conductivity control of the main thyristor 14 as the field current in the power mode of operation of the motor control apparatus for the motor 12, with the motor acting as a generator in the brake mode and producing an output voltage of opposite polarity in relation to the voltage source 10. Since the field current remains substantially the same in the power mode and in the brake mode this maintains the same back EMF voltage polarity for the generating motor 12. The current flow direction through the motor armature 12 changes in the brake mode as compared to the power mode.

In the brake mode with the main thyristor 14 not conducting, the current will flow through a circuit including the voltage source 10, the freewheeling diode 24, the motor reactor 18, the motor field 30, the brake thyristor 34, the motor armature 12 and any of the resistors 36, 38 and 40 that are not short circuited and through the brake diode 42 to regenerate power into the voltage source 10.

It is within the skill of the art to provide a solid-state switch around each of the dynamic brake resistors 36, 38 and 40 to include the respective brake resistors in or out of the brake current circuit as may be required when it is desired to provide full or partial dynamic braking of the vehicle. Depending upon the involved current level, these switches may comprise power transistor devices for lower current levels and thyristor devices for higher current levels, as well known in this art.

In reference to the motor control circuit shown in FIG. 1 when the desired vehicle operation requires changing from the power mode with the power thyristor 26 conducting to the brake mode with the brake thyristor 34 conducting, the brake thyristor 34 can be made conducting before the power thyristor 26 is made nonconducting such that both the power thyristor 26 and the brake thyristor 34 are conducting at the same time. This establishes a current path from the voltage source 10 and through the conduction control main thyristor 14, the motor reactor 18, the field winding 30, the brake thyristor 34, the power thyristor 26 and the ground return conductor 32 back to the voltage source 10 to provide a controlled current path through the motor reactor 18 and the motor field 30. Since the vehicle was previously in the power or acceleration mode and the motor is now running at some speed, the energized field winding 30 produces a magnetic field relative to the motor armature and the motor armature 12 generates a voltage that is a function of the motor speed and this field current. Thusly, during a transition period when going from the power mode to the brake mode the motor is caused to operate as a generator of back EMF voltage to provide a control of the armature voltage independent of the armature current.

Figure 5:
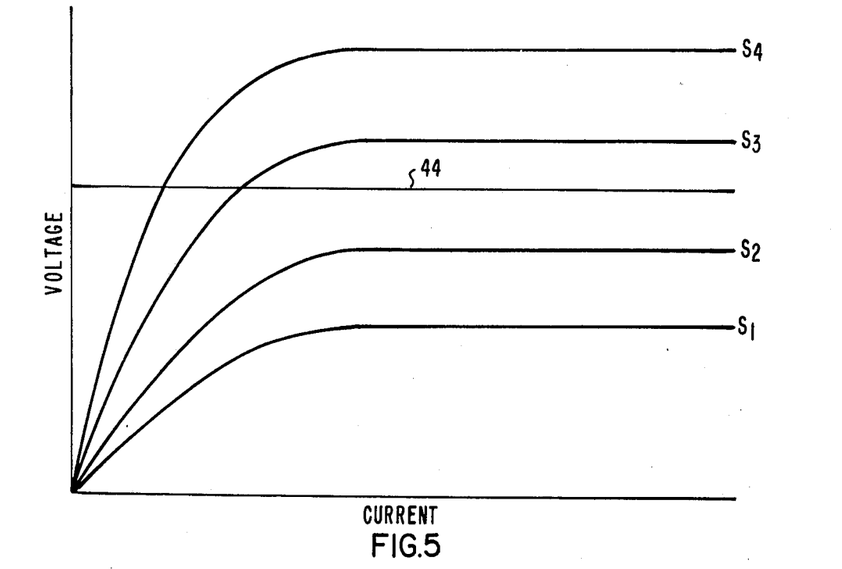
FIG. 5 shows the well-known operational voltage and current relationships for a series-connected direct current motor.

In FIG. 5 there is shown the well-known operational characteristic curves for a series-excited direct current motor such as typically employed for the propulsion of transit vehicles. If the generated back EMF voltage of the motor 12, which is now operating as a separately excited motor, could be increased to exceed the sum of the line voltage and the voltage drop of the power thyristor 26, it would be feasible to have the back EMF motor armature current flow in the power thyristor 26 become equal to or exceed the brake thyristor current flow in the power thyristor 26 such that the net current flow in the power thyristor 36 becomes zero or even negative and in this way self-commutates to shut off the conduction of the power thyristor 26. Over a short period of time the current component through the brake thyristor 34 cannot change as fast as the current component through the motor armature 12 because of the inductance provided by the motor reactor 18 and the field winding 30, and when the net current flow through the power thyristor because of this is zero, the power thyristor 26 will self-commutate. In actual practice however, at reasonably low vehicle and motor speeds the generated back EMF voltage of the motor armature 12 will not exceed the line voltage. The curves shown in FIG. 5 illustrate the speed restriction in relation to the line voltage 44.

To provide the desired control of the motor for particularly low vehicle operating speeds, a force-commutation circuit 46 is provided for the power thyristor 26. When both the brake thyristor 34 and the power thyristor 26 are conducting during the transition from power mode to the brake mode of operation, the commutation circuit 46 is operated to stop the conduction of the power thyristor 26. The current flow through the inductance of the motor reactor 18 and the field winding 30 will now continue to flow as brake current through the motor armature 12 to provide in effect a very rapid changeover from the power mode to the brake mode of operation. Because of the provision of the commutation circuit 46, brake mode operation is available down to very low vehicle speeds of operation with assured brake current buildup at much lower speeds and lower motor circuit currents than could be provided with prior art control apparatus. In addition, the main thyristor 14 can determine the magnitude of this brake current before the power thyristor 26 is commutated to establish at least the initial brake effort provided by the motor 12. In addition, the motor control circuit of FIG. 1 provides much faster power mode to brake mode transfer than could be obtained with prior art transit control apparatus that require mechanical brake power to changeover switches which had to be physically positioned and coordinated to determine the motor control apparatus operation.

Figure 6:
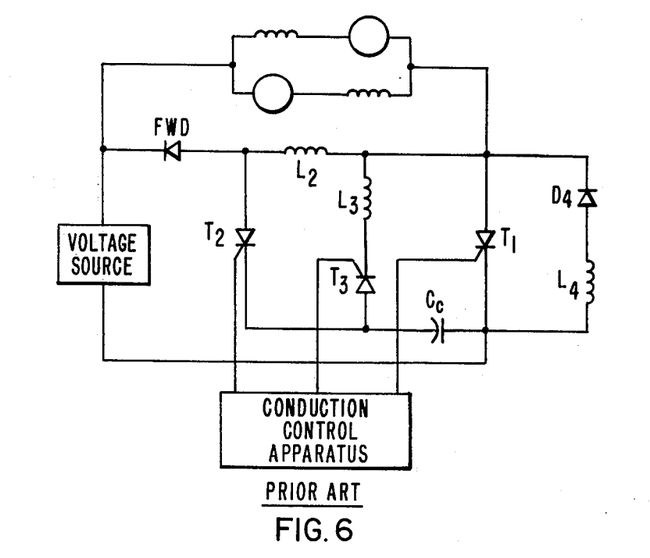
FIG. 6 shows a prior art direct current motor control apparatus for series-traction motors.

The prior art control apparatus such as shown in FIG. 6 when controlling an automated transit vehicle running with tight speed regulation required mechanical switches, as described in greater detail in the above-referenced published article, was continually changing back and forth between the power mode and the brake mode in an effort to provide a narrow tolerance in relation to the signal block desired command speed for the vehicle. In addition, the manufacturing cost of these mechanical switches is increasing as a function of time such that it is lower in cost at the present time to provide and maintain the desired power mode to brake mode and vice versa changeover operation in accordance with the solid-state switching apparatus of the present invention.

The motor control circuit as shown in FIG. 1 in addition provides a coast mode of operation that was not available with the prior art transit motor control apparatus, where neither one of the power mode and the brake mode of motor circuit operation is provided. The prior art transit motor control apparatus required operation in the power mode to build up enough motor armature current to permit the brake mode of operation to occur with an adequate brake effort buildup and with enough residual field flux to sustain the armature current and field flux in the motor. With the transit motor control apparatus of FIG. 1 a coast mode is practical with both the power thyristor 26 and the brake thyristor 34 not conducting. When it is desired to operate the motor control circuit in the brake mode without previous operation in the power mode, both of the power thyristor 26 and the brake thyristor 34 can be fired to become conducting and then the main thyristor 14 is used to regulate the current flow to a desired level through the field winding 30 and through those two thyristors 26 and 34 as previously described. When the brake mode of operation is desired, the commutation circuit 46 can terminate the conduction of the power thyristor 26 and the brake mode of operation begins as previously described. Thusly, when in the coast mode of operation it is not required to go in the power mode before going into the brake mode of motor operation. This permits a saving of considerable energy by not having to run in the power mode before going into the brake mode, for example, when the vehicle is operating on a downhill grade where periodic brake mode of operation might be desired to control the vehicle speed as desired in relation to a provided command speed for the vehicle.

When going from the power mode operation as shown in FIG. 3 to the brake mode of operation as shown in FIG. 4 a transition time period can be provided when the brake thyristor 34 is made conducting while the power thyristor 26 remains conducting. The brake thyristor 34 has a forward voltage drop in the order of 2 volts with the motor back EMF voltage usually being greater than such a voltage drop. This results in a reverse bias for the power diode 28 so the current path is now established from the voltage source 10 through the conducting main thyristor 14, the motor reactor 18, the field winding 30, the brake thyristor 34, the power thyristor 26 and the return conductor 32 back to the voltage source 10. When the main thyristor 14 is not conducting, the freewheeling diode 24 completes the current path from the return conductor 32 to the motor reactor 18. The main thyristor 14 in this way regulates the current flow through the field winding 30 during this transition period with the armature current path being eliminated.

Figure 7A:
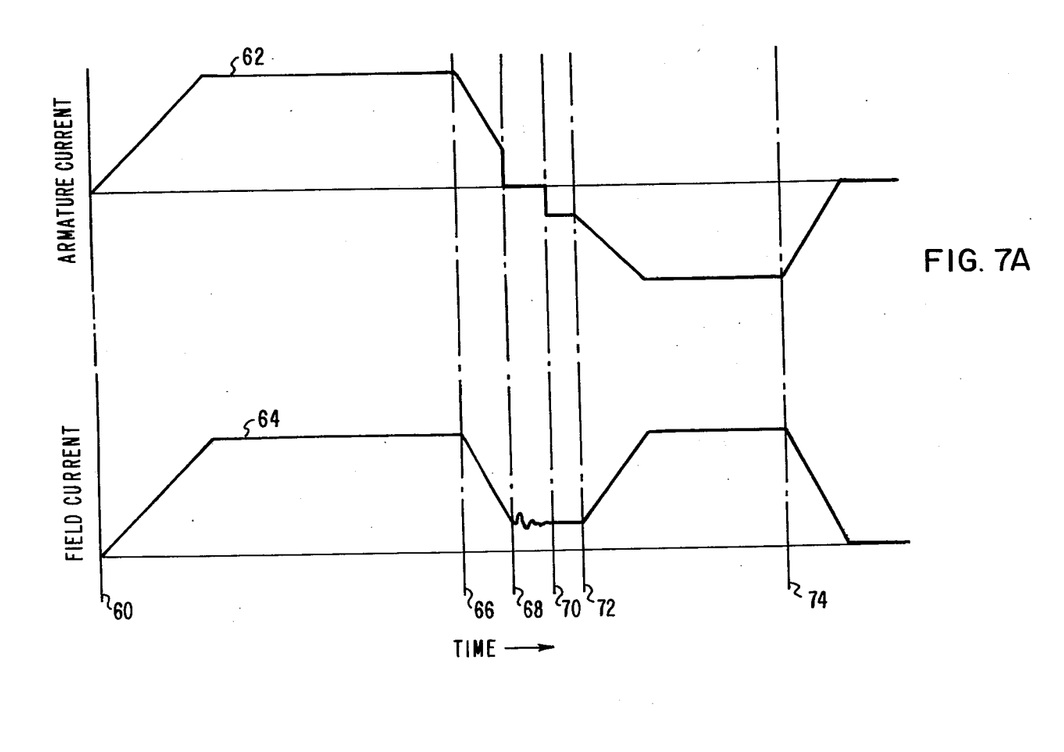
FIGS. 7A and 7B show operational current waveforms to illustrte the present invention.
Figure 7B:
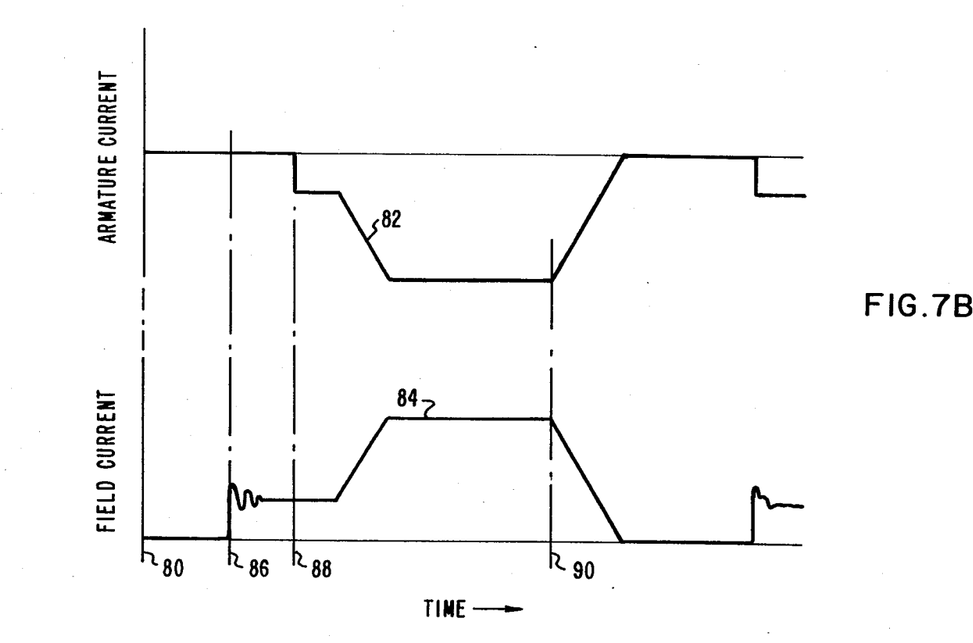

In FIGS. 7A and 7B, there is shown the operational relationships of the various voltage waveforms to illustrate the operation of the motor control apparatus of the present invention.

In FIG. 7A, there are shown current waveforms to illustrate the power mode and brake mode operations of the apparatus shown in FIG. 1 in accordance with the present invention. When the effort request P signal 17 provided to the conduction control apparatus 16 has a value above a predetermined level, such as 60 milliamps, the power mode of operation is initiated, with the power thyristor 26 being fired to be conductive at time 60. The armature current of the motor 12 is shown by curve 62, and when the power thyrister 26 becomes conductive, this armature current normally builds up as determined by the jerk limiter to a regulated desired value as determined by and corresponding to the value of the P signal. The corresponding motor field current is shown by curve 64. At time 66 and when the P signal has a value below a predetermined level, such as 60 milliamps, the brake mode is initiated, and the P signal causes the current to drop in accordance with the jerk limiter operation and when a reasonable level of field current is reached after maybe a one second time interval at time 68 the brake thyristor 34 is fired to be conductive. The armature current goes to zero as shown by curve 62 when the brake thyristor 34 becomes conductive and the field current is regulated at a suitable value by the chopper main thyristor 14 as shown by curve 64 for a predetermined time period as may be desired, for example 25 milliseconds, between time 68 and time 70. When the field current is stabilized and when desired for the brake mode of operation, at time 70 the power thyristor 26 is commutated to be not conductive by the commutation circuit 46 and the armature current now reverses as shown by curve 62. The field current shown by curve 64 and the armature current shown by curve 62 can now be increased, after a predetermined time period such as 25 milliseconds to settle the armature current, by the chopper main thyristor 14 and in accordance with the jerk limiter to provide the desired amount of brake effort. The time duration from time 68 to time 70 and the time duration from 70 to 72 can be empirically established for the particular motor circuit of a given vehicle, with the above value of 25 milliseconds being for purpose of example. At time 74 when brake effort is no longer desired, if the chopper main thyristor 14 stops conducting the respective armature and field currents will fall to zero as shown by the curves 62 and 64. If desired a return to power mode operation as previously described can then be made.

In FIG. 7B, there are shown current waveforms to illustrate the coast mode operation of the apparatus shown in FIG. 1. Assuming the vehicle propelled by the motor 12 is moving along a roadway track at time 80 after a previous power mode of operation and with the chopper main thyristor 14 not conducting, the armature current as shown by curve 82 and the field current as shown by curve 84 are both zero. To initiate the brake mode of operation at time 86, both the power thyristor 26 and the brake thyristor 34 are fired to be conductive and the field current builds up to a value as regulated by the main thyristor 14. When the field current has stabilized, at time 88 the power thyristor 26 is commutated and the armature current as shown by curve 82 goes to a controlled reverse value corresponding with the field current shown by curve 84 and as determined by the chopper main thyristor 14 controlling these current values in the brake mode of operation. When the brake mode is no longer desired by the P signal, the main thyristor 14 stops conducting and the armature current goes to zero as does the field current.

It is readily apparent and known by persons skilled in this art how to provide the required firing and commutation control signals from the conduction control apparatus 46 to effect each of the power mode, brake mode and coast mode operations as illustrated in FIGS. 7A and 7B.

It was the practice with the prior art power mode and brake mode motor control apparatus, such as shown in FIG. 6 and described in the above-referenced published article, for the mechanical change-over switch operation between these modes of operation to require from a one second to a three second time delay. For a vehicle traveling at 80 mph along a roadway track, this time delay would result in a considerable vehicle travel distance before the brake operation was started after the request was made for the brake mode. The present motor control apparatus shown in FIG. 1 in one operable embodiment provided a power mode to brake mode change-over in a time interval of about 50 milliseconds or less, which would give a faster speed of response to a change-over request for a vehicle propelled by motor 12 and would increase the vehicle throughput along a given track since the required safety clearances are reduced.

It is within the teachings of the present invention to utilize power transistor switch devices for one or more of the main thyristor 14, the power thyristor 26 and the brake thyristor 34 switch devices, depending upon the involved current and voltage levels being low enough for available power transistor devices. For example, depending upon the horsepower requirements for the motor 12, a power transistor might be suitable for one or more of these switch devices. This could make unnecessary the provision of the commutation circuit 46 in the apparatus of FIG. 1 if a power transistor were substituted for the power thyristor 26 as well known to persons skilled in this art.

I claim:

1. In control apparatus operative with a voltage source for determining one of a power mode of operation and a brake mode of operation for a motor coupled to a load and including a field winding and an armature, the combination of:

first switch means connected with said voltage source to provide a first current circuit to establish said power mode by energizing said field winding and energizing said motor armature in a first direction in relation to said voltage source when the first switch means is conducting, second switch means connected with said voltage source to provide a second current circuit to establish said brake mode by energizing said field winding and energizing said motor armature in a second direction in relation to said voltage source when the second switch means is conducting, control means coupled with said first switch means to make the first switch means conductive to determine said power mode of operation for the motor and coupled with the second switch means to make the second switch means conductive to determining said brake mode of operation for the motor, with said control means coupled with each of said first switch means and said second switch means to make both the first switch means and the second switch means conductive for providing a third current circuit for energizing said field winding without energizing said armature in relation to said voltage source, and conduction determining means operative with the first switch means to determine the conductivity of the first switch means in relation to the second switch means for establishing said brake mode of operation for said motor.

2. The control apparatus of claim 1, with said control means being responsive to an effort request signal such that the first switch means is made conductive for a first and higher value of the effort request signal and the second switch means is made conductive for a second and lower value of the effort request signal.

3. The control apparatus of claim 1, with said control means being operative to control the speed of the motor by accelerating the motor in the power mode to a desired speed of operation by making the first switch means conductive and then making both the first switch means and the second switch means conductive for a predetermined time period in accordance with the operation of the conduction determining means before decelerating the motor in the brake mode by the second switch means.

4. The control apparatus of claim 1 for determining the speed of said motor, with said control means making the first switch means conductive to accelerate the motor in the power mode followed by making the second switch means conductive to decelerate the motor in the brake mode and providing a predetermined time period in accordance with the operation of the conduction determining means between the conductivity of the first switch means and the conductivity of the second switch means when both the first and second switch means are conductive.

5. The control apparatus of claim 1 for providing a brake mode of operation for said motor after a coast operation for said motor, with said control means making the first and second switch means conductive to provide the third current circuit to energize said field winding and then the conduction determining means making the first switch means not conductive to determine said brake mode of operation.

6. In the method of controlling in each of a power mode and a brake mode the operation of a motor having a field winding and an armature coupled with a power supply, the steps of:
- operating a first switch in the power mode to be conductive in one circuit arrangement including the power supply, the field winding and the armature for providing current through the armature in a first direction;
- operating both the first switch and a second switch between operation in the power mode and in the brake mode to be conductive in another circuit arrangement including the power supply and the field winding for providing current through the field winding; and
- terminating the operation of the first switch while continuing the operation of the second switch in the brake mode to be conductive in a different circuit arrangement including the field winding and the armature for providing current through the armature in a second direction.

7. The method of claim 6, with the current through the field winding being in the same direction when the first switch is conductive, when the second switch is conductive and when both the first and second switches are conductive.

8. The method of claim 6, including the step of operating each of the first switch and the second switch to be not conductive with no current being provided in each of the field winding and the armature before the step of operating both the first switch and the second switch.

9. In the method of controlling a motor for a moving vehicle and having a field winding and an armature, said motor being coupled with a power supply, the steps of:
- providing a power mode of operation for said motor to move said vehicle by providing a first current path including the field winding and the armature and with the current flow through the armature being in a first direction;
- providing a brake mode of operation for said motor to brake said vehicle by providing a second current path including the field winding and the armature and with the current flow through the armature being in a second direction; and
- providing a change-over for the moving vehicle from the power mode to the brake mode by providing a third current path including the field winding without the armature.

10. The method of claim 9, including the step of providing a coast mode of operation for said motor to coast said vehicle before said step of providing said change-over when each of said first and second current paths are not provided.

* * * * *